UNITED STATES PATENT OFFICE.

HUGH RODMAN, OF PITTSBURG, PENNSYLVANIA.

PROCESS OF RE-TREATING CEMENTATION COMPOUNDS.

949,441.  Specification of Letters Patent.  Patented Feb. 15, 1910.

No Drawing.  Application filed April 3, 1908.  Serial No. 424,892.

*To all whom it may concern:*

Be it known that I, HUGH RODMAN, a citizen of the United States, and a resident of Pittsburg, in the county of Allegheny and State of Pennsylvania, have made a new and useful Invention in Processes of Re-Treating Cementation Compounds, of which the following is a specification.

This invention relates to the art of cementation, or case hardening, and has to do particularly with the regeneration of spent or exhausted cementing material.

It has been the custom, to the best of my knowledge, in using cementing materials, such, for instance, as bone, to use this material once, sometimes twice, and to then discard it as useless, its properties of giving up carbon to low carbon iron and steel having been nearly or quite exhausted. I have discovered that such exhausted bone, even that which has been burned until there is practically no carbon remaining and absolutely no cementation to be gotten from it, can be revivified and brought to approximately its original condition of usefulness by adding to or soaking into the spent material some carbon carrying substance, such as molasses, tar, asphaltum, petroleum, etc. The resultant material may be used exactly as the fresh bone is used and with practically the same results and this retreatment may be utilized a number of times upon the same material.

I attribute the activity of the carbonaceous material soaked into or mixed with the spent bone to the ultimate intimate resulting mixture of carbon and the alkali or alkali earth compounds contained in spent bone. That such cementing properties are not inherent to the oil, asphaltum, etc., I have proven by soaking them into such material as porous brick or clay or coke, which contained no active alkali or alkali-earth compound, under which conditions they will produce no appreciable cementation. I have also obtained excellent results by adding to the spent bone, in addition to the carbonaceous material, a small percentage of alkali or alkali-earth compound, such, for instance, as sodium carbonate, which has the property of greatly accelerating the action of the carbon added.

For examples of such regenerated material, but with no intention of restricting the scope of the invention thereto, I may cite: Spent or partially spent bone saturated with black molasses, such as used in foundries. Powdered spent bone mixed with 10% of lime and saturated with crude petroleum. Spent bone saturated with a solution of soda-ash, dried and then saturated with black molasses or crude petroleum. Spent bone with or without the addition of soda-ash, as above, heated and then impregnated with asphaltum. It will be obvious that other spent cementing material than bone, such, for instance, as leather, may be revivified in the same manner as bone may.

I believe I am the first to make use of spent carbonizing materials as a basis for the preparation of active carbonizing materials, and am, as such, entitled to broad protection in the art.

What I claim is:

1. The method of reënergizing spent carbonizing material for use in cementation which consists in adding to such spent material carbonaceous material.

2. The method of reënergizing spent bone for use in cementation which consists in impregnating such spent bone with carbonaceous material.

3. The method of revivifying spent bone for use in cementation which consists in adding to such spent bone carbonaceous material and an energizer.

4. The method of revivifying spent carbonaceous material for use in cementation which consists in adding to such spent material carbonaceous material and soda-ash.

In testimony whereof, I have hereunto subscribed my name this 1st day of April, 1908.

HUGH RODMAN.

Witnesses:
BIRNEY HINES,
E. W. McCALLISTER.